United States Patent [19]

Inoue

[11] Patent Number: 4,767,905
[45] Date of Patent: * Aug. 30, 1988

[54] EDM METHOD AND APPARATUS WITH TRAPEZOIDIZED SHORT-DURATION PULSES

[75] Inventor: Kiyoshi Inoue, Tokyo, Japan

[73] Assignee: Inoue-Japax Research Incorporated, Kanagawa, Japan

[*] Notice: The portion of the term of this patent subsequent to Jun. 9, 2004 has been disclaimed.

[21] Appl. No.: 905,853

[22] Filed: Sep. 10, 1986

Related U.S. Application Data

[63] Continuation of Ser. No. 633,186, Jul. 23, 1984, Pat. No. 4,672,161.

[30] Foreign Application Priority Data

Jul. 24, 1983 [JP] Japan ................. 58-134889

[51] Int. Cl.⁴ .................. B23H 1/02; B23H 3/02
[52] U.S. Cl. .................. 219/69 P; 219/69 C
[58] Field of Search .................. 219/69 C, 69 P; 204/129.43, 224 M; 307/268

[56] References Cited

U.S. PATENT DOCUMENTS

| | | | |
|---|---|---|---|
| 3,655,937 | 4/1972 | Ullmann et al. | 219/69 P |
| 3,676,708 | 7/1972 | Uchida | 307/268 |
| 3,974,357 | 8/1976 | Saito et al. | 219/69 P |
| 4,064,407 | 12/1977 | Kelleher | 307/268 |
| 4,382,168 | 5/1983 | Inoue | 219/69 C |

FOREIGN PATENT DOCUMENTS

| | | | |
|---|---|---|---|
| 47-2840 | 1/1972 | Japan | 219/69 P |
| 127624 | 8/1982 | Japan | 219/69 C |
| 428024 | 7/1967 | Switzerland | 219/69 C |

Primary Examiner—A. D. Pellinen
Assistant Examiner—Geoffrey S. Evans
Attorney, Agent, or Firm—Herbert Dubno

[57] ABSTRACT

An EDM method and system in which a DC output is pulsed to produce a succession of discrete, time-spaced, essentially unidirectional current pulses of a short duration not in excess of 10 microseconds for finish-machining a workpiece with a tool electrode across a fluid flooded EDM gap, each of the discrete current pulses having an essentially half-cycle sinusoidally rising and falling current-time characteristic and a peak current in excess of a predetermined current level. According to the invention, a peak current portion of each of the current pulses beyond the predetermined level is clipped to produce a reformed gap current pulse which is substantially square- or trapezoid-edged and has the predetermined current level.

4 Claims, 3 Drawing Sheets

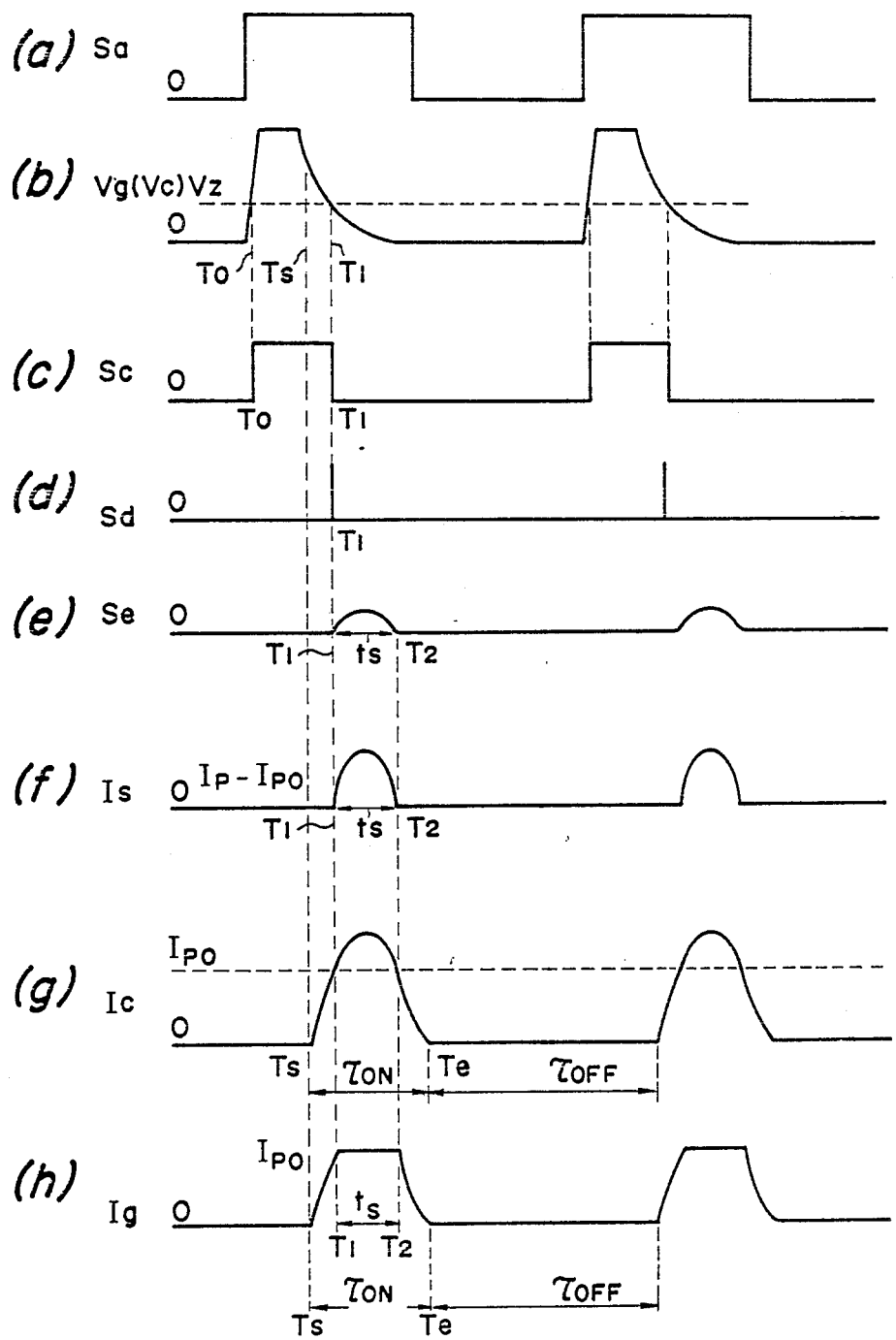

EDM METHOD AND APPARATUS WITH TRAPEZOIDIZED SHORT-DURATION PULSES

CROSS-REFERENCE TO RELATED APPLICATIONS

This application is a continuation of Ser. No. 6/633,186 filed July 23, 1984 now U.S. Pat. No. 4,672,161.

FIELD OF THE INVENTION

The present invention relates to electroerosion machining and, more particularly, to a method of and apparatus for machining a workpiece with a tool electrode by passing a succession of electroerosive machining pulses with a predetermined level of peak current and of a short pulse duration not in excess of 10 microseconds consecutively between the tool electrode and the workpiece across a machining gap flooded with a fluid medium.

BACKGROUND OF THE INVENTION

The process of electroerosion machining, now widely in use in the industry, may be applied in various forms. For example, "traveling-wire" electroerosion, a thin, continuous wire, tape or ribbon is employed as the tool electrode to form contours of various shapes in workpieces. In "sinking" electroerosion, a formed solid electrode may serve as the tool electrode to shape a cavity complementary in shape thereto in a workpiece. In "generic" electroerosion, a "non-formed" or generic electrode is constituted as the tool electrode moving in a scanning manner relative to the workpiece to form an intricate cavity or contour therein.

In the varying practical forms of electroerosion, it is a common requirement that the erosive current be furnished in a succession of discrete, time-spaced current pulses, which can be produced by pulsing a DC output. It has been found important that the current pulses be square or rectangular in waveform, this being particularly the case where the workpiece is to be "rough" machined. A "roughing" operation requires long current pulses whose duration or "on" time $\tau on$ ranges, say, in excess of 50 microseconds and often in the millisecond order. Given a particular mode of operation, it is important that "square" current pulses have a particular duration $\tau on$, a particular pulse interval or "off" time $\tau off$ and a particular current level Ip established in a particular combination to yield a particular set of machining results (e.g. surface roughness, overcut, relative electrode wear and stock removal) desired for that particular operation. Thus, the need arises to be capable of obtaining any "square" roughing-mode pulse with the pulse parameters $\tau on$, $\tau off$ and Ip independently adjusted. This capability is indeed vital to a modern electroerosion generator as it is designed to apply to a variety of rough and relatively rough machining operations.

In the finish machining range, however, it has been found that different considerations must apply. The finer the surface finish sought, the shorter must the pulse duration be, towards and desirably into the nanosecond order. Then, the greater the difficulty in retaining the squareness of erosive current pulses. Thus, when the pulse duration $\tau on$ must be as short as 10 microseconds or less, the pulse can be at least sinusoidal in its current-time characteristic, even when a conventional, most-advanced fine-pulsing erosion generator, either of switching or capacitor type, is employed. It should be noted that a typical switching-type erosion generator primarily for roughing modes may even fail to assure against the possibility that because of the short pulse duration the current may cease without rising to a desired level. At any event, while a short delay time which entails in the transitions between the "on" and "off" states of the switch is negligible in a longer, roughing pulse, it can no longer be so with any narrow, finishing pulse. While the capacitor-type pulsing system has been preferred because of its ability to secure a highly elevated current rise and also to reduce or eliminate the switching transitions, it is recognized that a capacitor discharge current is intrinsically sinusoidal, and its pulse duration and peak current must be more or less mutually dependent. These restrictions are also inherent to the modern switching-type system (devoid of a storage capacitor) in which a higher DC output is required to reduce the switching transitions as will be readily recognized. Thus, in the finish machining range, there have been severe limitations in formulating erosive pulses, which do not arise in the rough machining range.

Vis a vis these limitations, I have discovered that problems arise in the actual performance of erosive machining pulses in the finish range which necessitates a pulse duration as short as 10 microseconds or less. There is a constant desire to improve the machining efficiency without affecting other machining factors, say, the surface finish. The breakage of a wire electrode in a traveling-wire erosion operation is fatal since the machining operation must be interrupted. The machining efficiency can be measured by the removal rate which is a function of the stock removal and the machining estability. The problem of wire breakage is associated with the electrode wear and the discharge stability. It has been found that the foregoing limitations inherent in the prior art have severely hindered attempts to achieve improved results in the finish erosion range.

OBJECTS OF THE INVENTION

It is, accordingly, an important object of the present invention to provide an improved electroerosion machining method, particularly in the finish machining range, which can markedly improve the machining efficiency and reduce the electrode breakage by providing improved short-duration erosive pulses.

Another important object of the present invention is to provide an improved electroerosion machining power supply apparatus which is suitable to carry out the method described and is capable of attaining improved finish machining results.

SUMMARY OF THE INVENTION

In accordance with the present invention there is provided, in a first aspect thereof, a method of machining as electrically conductive workpiece with a tool electrode by passing a succession of electroerosive machining pulses with a predetermined current level and of a short pulse duration not in excess of 10 microseconds consecutively between the tool electrode and the workpiece across a machining gap flooded with a fluid medium, which method comprises: pulsing a DC output to produce a succession of discrete, time-spaced, essentially unidirectional current pulses of a said short pulse duration for passage through said machining gap, each of the said discrete current pulses having an essentially sinusoidally rising and falling characteristic and a peak current in excess of the said predetermined current level; clipping a peak current portion of each said essentially sinusoidal current pulse beyond the said predetermined level to reform it to be substantially square- or trapezoid-edged and have substantially the said predetermined current level within the said short duration; and passing between the tool electrode and the workpiece the said reformed current pulses consecutively in succession constituting the said succession of electroerosive machining pulses.

The invention also provides, in a second aspect thereof, an apparatus for machining an electrically conductive workpiece with a tool electrode by passing a succession of electroerosive machining pulses with a predetermined current level and of a short pulse duration not in excess of 10 microseconds between the tool electrode and the workpiece across a machining gap flooded with a fluid medium; which apparatus comprises: a DC source; pulse forming means for pulsing an output of the DC source to produce a succession of discrete, time-spaced, essentially unidirectional current pulses of a said short pulse duration for passage through the machining gap, each of the discrete current pulses having an essentially sinusoidally rising and falling current-time characteristic and a peak current in excess of the said predetermined level; and pulse reforming means for clipping a peak current portion of each said essentially sinusoidal current pulse beyond the said predetermined level so that the resulting current pulse is substantially square- or trapezoid-edged and has substantially the said predetermined current level within the said short duration, and passing the resulting current pulses in succession, constituting the said succession of electroerosive machining pulses, between the tool electrode and the workpiece.

BRIEF DESCRIPTION OF THE DRAWINGS

These and other features of the present invention as well as advantages thereof will become more readily apparent from a reading of the following description taken with reference to the accompanying drawings in which:

FIG. 5(a)–5(h) are waveforms diagrams representing signals which appear at various portions in the circuit of FIG. 2.

SPECIFIC DESCRIPTION

Figure 1:
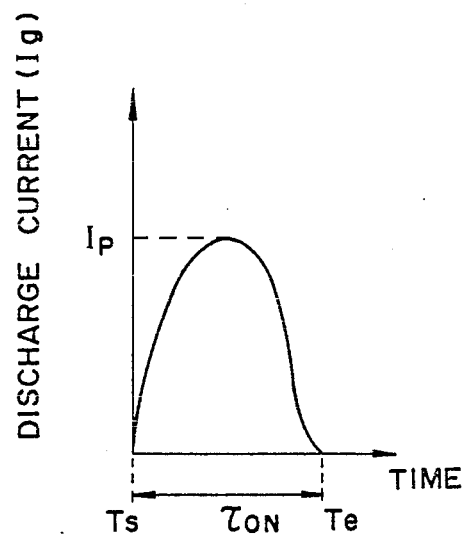
FIG. 1 is a waveform diagram illustrating a conventional finish-mode erosion current pulse having a sinusoidal current-time characteristic.

Referring now to FIG. 1 there is shown a sinusoidal waveform which the discharge current pulse (Ig) across the erosion gap in the conventional system commonly assumes when the pulse duration or "on" time is reduced to 10 microseconds or less. During the time $\tau$on, the current starting at time instant Is rises substantially sinusoidally to the peak level Ip and then falls substantially sinusoidally to zero at time instant Te so that the entire waveform is of a substantially sinusoidal half wave and the short pulse duration $\tau$on. In setting the pulse parameters, the prior-art consideration was that the peak current Ip is a necessity to secure the particular pulse duration $\tau$on. It has now been found that this limitation inherent to the sinusoidity of the pulse waveform unduly restricts the possible performance of finish erosion pulses.

Figure 2:
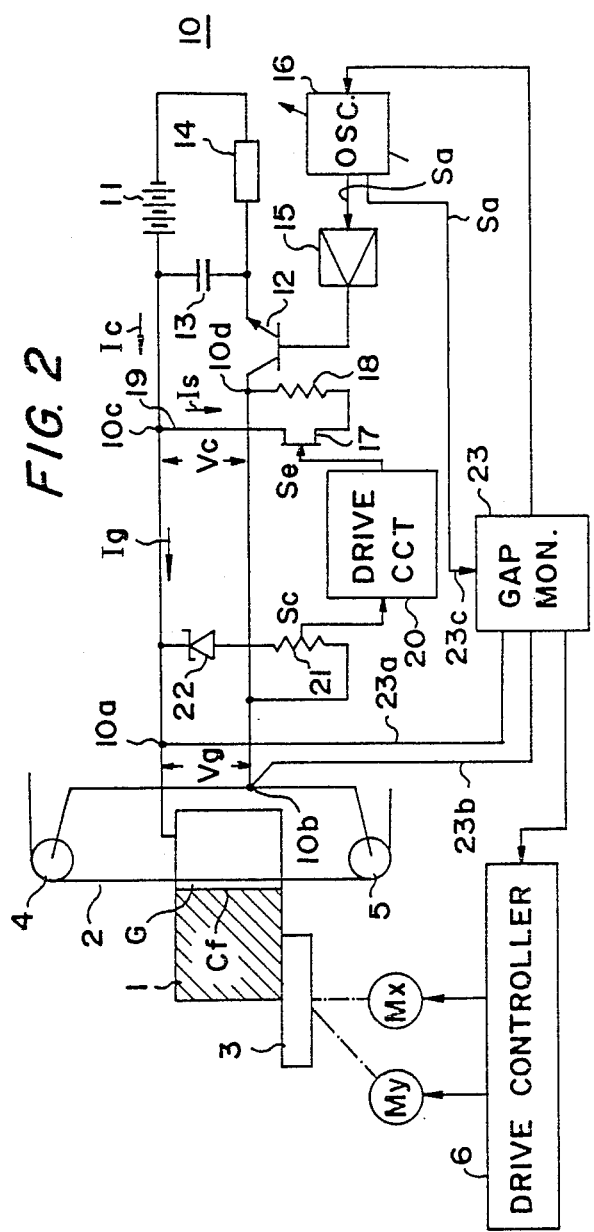
FIG. 2 is a circuit diagram illustrating an apparatus according to the present invention.

In FIG. 2 there is shown an improved power circuit arrangement for machining a conductive workpiece 1 with a tool electrode 2 which is shown to be a traveling wire electrode. The workpiece 1 is securely mounted on a worktable 3 which is arranged to be driven by a pair of motors Mx, My. The wire electrode 2 is supported between a pair of guide elements 4, 5 and is axially advanced therebetween through the workpiece 2. The wire electrode 2 is continuously advanced from a supply drum (not shown) and taken up onto any suitable takeup means (not shown). A fluid medium, typically a dielectric liquid such as deionized water, is supplied from nozzle means (not shown) into a machining gap G defined between the traveling wire electrode 2 and a cutting front Cf in the workpiece 1. As machining proceeds with improved erosive pulses to be described, the workpiece 1 is displaced relative to the traveling electrode 2 to advance the stock removal at the cutting front Cf in the workpiece along a programmed cutting path according to command signals furnished from a control unit 6 to the drive motors Mx, My in the conventional manner.

The improved power supply to be described is generally designated at 10 and has a pair of output terminals 10a and 10b, one of which is electrically connected to the workpiece 1 and the other of which is electrically connected to the guide members 4, 5 which are here shown to serve also to energize the wire electrode 2 at the opposite sides of the workpiece 1. Thus, a succession of improved discrete, time-spaced erosive current pulses from the power supply 10 develops across the machining gap G between the electrode 2 and the workpiece 1.

The power supply 10 basically comprises a DC (direct current) source 11 of an adjustable voltage and current output, and a power switch 12 and/or a storage capacitor 13 for pulsing the DC output in the conventional manner to produce a succession of discrete, time-spaced essentially unidirectional current pulses across terminals 10c and 10d. The capacitor 13 is shown as connected in parallel to the DC source 11 and the machining gap G. The power switch 12 is shown as connected in series with the DC source 11 and the machining gap. This switch is necessary if the capacitor 13 is omitted. If the capacitor 13 is employed, the switch 12 may be omitted. However, it is preferred to use both the switch 12 and the capacitor 11 connected as shown, thus in series with the machining gap G. The use of the capacitor 11 is desirable to ensure a high peak level of current Ip during each pulse which develops across the terminals 10c and 10d. The higher the peak level of current employed, the sharper the current rise and fall. The use of the switch 12 is desirable to ensure proper timing and accuracy of the duration $\tau$on.

In the system illustrated, the capacitor 13 is connected on the one hand in series with the DC source 11 and a charging impedance 14 and on the other hand in series with the machining gap G and the switch 12. The capacitor 13 is cyclically charged and discharged to provide a succession of current pulses. In each cycle, the capacitor 13 is charged from the DC source 11 via the charging impedance 14 and the charge stored on the capacitor 13 is discharged when the switch 12 is turned on to produce a current pulse or discharge current rising sinusoidally to a peak current Ip and then falling sinusoidally to zero. This capacitor discharge current is shown by a phantom line Ic in FIG. 3, and may be considered to be the same as that shown in FIG. 1. When the switch 12 is turned off or the pulse ceases with a preset short duration on, the capacitor 12 is allowed to recharge from the DC source, and the cycle is repeated.

The switch 12 is turned on and off repetitively in response to signal pulses furnished via an amplifier 15 from an oscillator 16 and as shown in FIG. 5(a). The "on" time and "off" time of the signal pulses and hence of the switch 12 basically determine the pulse duration $\tau$on and the pulse interval $\tau$off. The oscillator 16 is adjustable to provide the particular "on" time $\tau$on and "off" time $\tau$of desired. The capacitor 13 may be one of many capacitors of different capacitances provided in parallel and selectively put into operation to basically provide the particular peak current Ip.

A serial network of a switch 17 and a resistor 18 is connected between the junctions or terminals 10c and 10d to form a shunt path 19 in parallel with the capacitor 13 and the machining gap G. The shunt switch 17 is preferably constituted by a V-MOS field-effect transistor having a high-speed response characteristic with a response speed of 10 to 100 nanoseconds and is turned on and off by a signal furnished from a drive circuit 20 to establish the shunt path 19. The function of the shunt path 19 is bypass or shunt therethrough and thereby to clip, a peak portion of the discharge current pulse beyond a predetermined level Ipo so that the resulting current pulse as applied across the erosion gap is square- or trapezoid-edged at both its leading and trailing edges and has a substantially constant current level Ipo, as shown in FIG. 3.

Figure 3:
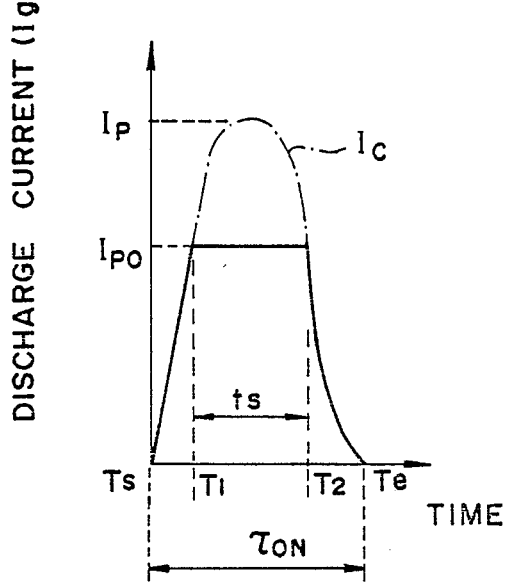
FIG. 3 is a waveform diagram illustrating a typical form of the trapezoidal (approximately square or rectangular) finish-mode erosive current pulse obtained on clipping a conventional sinusoidal current pulse according to the present invention.

The drive circuit 20 operates to establish the shunt path 19 for a certain time period ts during the capacitor discharge period $\tau$on (FIG. 3). To secure this timing, in the system illustrated a signal is derived at a sensing resistor 21 connected in series with a Zenor diode 22 between the junctions 10a and 10b, across which junctions the terminal voltage Vc of the capacitor 13 while the switch 12 is on and hence the voltage Vg across the machining gap G appears as shown in FIG. 5(b). The Zenor diode 22 is rendered conductive at time To when its breakdown level Vz is traversed by the terminal voltage Vg (Vc) rising upon the turn-on of the switch 12 and is thereafter rendered nonconductive when the voltage Vg (Vc) falling upon a dielectric breakdown at the gap G, thus upon inidiation of the gap discharge current Ig, at time Ts, passes through this level Vz, at time T1. As a result, a signal Sc develops at the resistor 21 during the time interval T0-T1. The Zenor voltage Vz is set to correspond to a particular level Ipo of the discharge current Ic.

Figure 4:
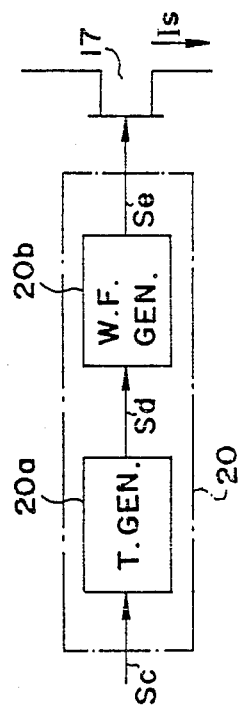
FIG. 4 is a diagrammatic representation of a portion of the circuit shown in FIG. 2.

As shown in FIG. 4, the drive circuit 20 includes a timing generator 20a and a waveform generator 20b. The timing generator 20a responds to the decay of the signal Sc at time T1 to provide the timing signal, FIG. 5(d), which signal triggers the waveform generator 20b into operation. The waveform generator 20b is here designed to furnish the transistor 17 with an energization signal Se which, starting at T1, rises and falls sinusoidally or triangularly, ending at T2 with the duration ts as shown in FIG. 5(e). The transistor 17 here acts as a variable conductor whose conductance varies proportionally to the energization signal Se. As a result, a portion of the discharge current Ie, FIG. 5(g), is bypassed through the circuit 19 as the shunt current Is as shown in FIG. 5(f). The sinusoidal or triangular signal is generated in the generator 20b to conform to the varying current magnitude of the peak portion T1-T2 of the discharge current beyond the preset current level Ipo so that the remaining discharge current passing through the machining gap G is substantially square- or trapezoid-edged at both its leading and trailing edges and has a substantially constant peak current level Ipo.

EXAMPLE

A workpiece composed of an SKD (Japanese Industrial Standard) steel material having a thickness of 100 mm is machined by electroerosion using a deionized water fluid medium with a resistivity of $4 \times 10^4$ ohm-cm and a brass wire electrode having a diameter of 0.2 mm. The pulse duration $\tau$on of erosive discharge pulses is set at 2.8 microseconds to yield a fine finish. When the pulses are produced in the conventional system to leave each sinusoidal and having a peak current Ip of 190 amperes, the removal rate is 116 mm$^2$/min but the wire electrode tends to be broken. When a peak portion of each of these current pulses is clipped in the system shown to hold the peak current Ipo to 140 amperes, the removal rate is increased to 140 mm$^2$/min and no breakage of the wire electrode takes place. In each pulsing cycle, the clipping operation is initiated when the falling gap voltage Vg passes through a voltage level of 55 volts.

The arrangement shown in FIG. 2 also includes a gap monitoring circuit 23 having a pair of input terminals 23a and 23b connected to the junctions or terminals 10a and 10b, respectively, and a third input terminal 23c leading from the oscillator 16. The monitoring circuit 23 is designed to monitor each gap pulse with reference to a signal pulse from to oscillator 16. If there is any failure from an optimum discharge mode, the monitoring circuit 23 provides a feedback signal which is on the one hand furnished to the oscillator 16 to decrease or increase the repetition rate or to increase or decrease the pulse interval $\tau$off of the signal pulses Sa and on the other hand to the drive controller 6 to modify the rate of relative displacement between the tool electrode 2 and the workpiece 1. An optimum condition can thus be maintained in the machining gap.

What is claimed is:

1. A method of machining an electrically conductive workpiece with a tool electrode by passing a succession of electroerosive machining pulses with a predetermined current level and of a short pulse duration not in excess of 10 microseconds consecutively between the tool electrode and the workpiece across a machining gap flooded with a fluid medium, the method comprising the steps of:

pulsing a DC output to produce a succession of discrete, time-spaced, essentially unidirectional current pulses of a said short pulse duration for passage through said machining gap, each of said discrete current pulses having an essentially sinusoidally rising and falling characteristic and a peak current in excess of said predetermined level;

clipping a peak current portion of each of said essentially sinusoidal current pulse beyond said predetermined level to reform it to have substantially a pair of steep flanks bridged by a plateau and have substantially said predetermined current level in said short duration; and passing between the tool electrode and the workpiece said reformed current pulses consecutively in succession constituting said succession of electroerosive machining pulses.

2. An apparatus for machining an electrically conductive workpiece with a tool electrode by passing a succession of electroerosive machining pulses with a predetermined current level and of a short pulse duration not in excess of 10 microseconds between the tool electrode and the workpiece across a machining gap flooded with a fluid medium, the apparatus comprising:

a DC source;

pulse forming means for pulsing an output of the DC source to produce a succession of discrete, time-spaced, essentially unidirectional current pulses of a said short pulse duration for passage through said machining gap, each of said discrete current pulses having an essentially sinusoidally rising and falling current-time characteristic and a peak current in excess of said predetermined level; and pulse reforming means including a network connected in shunt across said workpiece and said electrode for clipping a peak current portion of each of said essentially sinusoidal current pulses beyond said predetermined level so that the resulting current pulse has substantially a pair of steep flanks bridged by a plateau and has substantially said predetermined current level within said short duration, and passing said resulting current pulses in succession, constituting said succession of electroerosive machining pulses, between the tool electrode and the workpiece.

3. The apparatus defined in claim 2 wherein said pulse forming means includes a capacitor connected across said electrode and said workpiece.

4. The apparatus defined in claim 3, further comprising an electronic switch connected in series with said capacitor across said electrode and said workpiece.

* * * * *